United States Patent [19]

Curshod

[11] Patent Number: 5,204,777

[45] Date of Patent: Apr. 20, 1993

[54] ENERGY EFFICIENT SKYLIGHT AND BLIND

[75] Inventor: Donald B. Curshod, Woodside, Calif.

[73] Assignee: SEA Corporation, Sunnyvale, Calif.

[21] Appl. No.: 825,204

[22] Filed: Jan. 23, 1992

[51] Int. Cl.⁵ .................... G02B 17/00; G02B 27/00
[52] U.S. Cl. ...................................................... 359/596
[58] Field of Search ............. 359/591, 592, 594, 596, 359/597; 126/439, 440

[56] References Cited

U.S. PATENT DOCUMENTS

| | | | |
|---|---|---|---|
| 3,511,559 | 5/1970 | Foster | 350/258 |
| 4,022,186 | 5/1977 | Northrup, Jr. | 126/271 |
| 4,509,825 | 4/1985 | Otto et al. | 350/259 |
| 4,517,960 | 5/1985 | Bartenbach | 126/440 |
| 4,723,535 | 2/1988 | Lew | 126/439 |
| 4,805,984 | 2/1989 | Cobb, Jr. | 350/96.28 |
| 4,841,672 | 6/1989 | Nebhuth et al. | 350/263 X |

Primary Examiner—Richard A. Wintercorn
Attorney, Agent, or Firm—Patrick T. King

[57] ABSTRACT

An energy-efficient barrier uses thin slats, on one side of which are formed a number of reflective surfaces. The reflective surfaces are oriented at an angle, with respect to the face of the slat, to maximize reflection of the rays of the sun. The parallel reflective surfaces are formed as a series of ridges along the length of a slat and as the treads of a series of stairsteps formed along the length of a slat. The slats can be formed of extruded material with the reflective surfaces formed of reflective material which is polated on V-grooves formed in the slats. The slats are oriented in relation to the direct rays of the sun to pass the direct rays of the winter sun between the wider faces of the slats. The reflective surfaces on each slat are also aligned to reflect the direct rays of the summer sun. In a skylight assembly, one or more spacer members are provided having complementary slots formed therein for engagement with corresponding slots formed in the slats to properly align the slats with respect to the sun. The slats can be fixed as in a skylight, or variable such as in a Venetian blind. Deflectors attached to the trailing edges of the slats deflect the direct sunlight into a more vertical path. A Fresnel lens concentrator and reflector assembly directs winter sunlight into a structure, while directing summer sunlight away from the structure. Sunlight is guided through hollow light guides from a skylight assembly to one or more locations within a building.

56 Claims, 10 Drawing Sheets

5,204,777

ENERGY EFFICIENT SKYLIGHT AND BLIND

BACKGROUND OF THE INVENTION

1. Field of the Invention

This invention relates techniques for utilizing solar energy and, more particularly, to energy efficient barriers which are selectively oriented to pass or block direct solar energy.

2. Prior Art

Conventional skylights and window blinds in buildings often provide undesirable paths for solar energy gains and heat losses. For example, in winter it is desirable to maximize the amount of solar energy entering a building, while in summer, it is desirable to minimize the amount of solar energy entering a building. A problem is that conventional skylights and window blinds provide solar energy gains and losses which are the opposite of what is desired during a particular season.

A number of techniques have been developed for optimizing the energy gains and losses through skylights and windows. One technique for returning solar energy uses a large reflective prismatic panel for window or skylight glazing. A very thin film with a thickness of 20 thousandths of an inch is solvent bonded to an acrylic sheet to form a panel. The panel has a front surface into which sunlight enters and the film provides a series of prisms which are internally formed on the back wall of the panel. Light enters the front surface of the panel and passes through the panel to the back wall. The light is then reflected back from the prisms internally formed in the back wall of the plate using total internal reflection (TIR). The reflected light passes again through the panel and out of the front surface of the panel. The panel is fixed in its orientation to the direct rays of the sun and is not adjustable or selective in its operation. Its operation does not easily account for seasonal differences, where it may be desirable to either transmit or block solar energy from passing therethrough. One problem with this technique is that light is trapped and returned only within a narrow acceptance angle. Light falling outside of the acceptance angle passes through the film. This technique has an acceptance angle, for example, of plus or minus 10 degrees. It is desirable that the acceptance angle be on the order of plus or minus 30 degrees.

Venetian blinds for windows and skylights have a number of horizontal slats which are simultaneously adjustable at different angles to vary the amount of solar energy passed through. A paper published in *Solar Energy* Vol. 44, No. 3, pp. 157-160, 1990 by the Pergamon Press entitled "Experimental Study of Full-Size Automated Venetian Blind Windows" discloses an automated venetian blind system with horizontally pivoted louvers which are hermetically sealed between two glass panes. The louvers are fixed at both ends to the sides of a window unit and can be rotated around a horizontal axis by a mechanical system. A problem with this concept is that the blinds heat up and then transfer heat to the inside of the building by radiation and conduction. Three major heat-exchange mechanisms are present in this arrangement: radiative; convective exchange both inside and outside of the cavity defined by the glass panes; and conductive exchange in the wall of the building where the system is installed.

Consequently, the need has arisen for techniques to optimize the amount of solar energy either passed or reflected by a skylight or window for the different seasons.

SUMMARY OF THE INVENTION

It is therefore an object of the invention to provide a technique for optimizing the amount of solar energy rejected during the summer months and received during the winter months.

In accordance with this and other objects of the invention, an energy-efficient barrier for the direct rays of the sun is provided. The invention uses slats which each have a thin cross-section and wider opposite faces. On one of the faces is formed a number of reflective surfaces. The reflective surfaces on the one face of a slat include a plurality of parallel reflective surfaces which are oriented at an angle with respect to the face of the slat where the reflective surfaces maximize reflection of the rays of the sun. In one specific embodiment, the parallel reflective surfaces are formed as a series of ridges along the length of a slat. The reflective surfaces are formed as the treads of a series of stairsteps formed along the length of a slat. The slats can be formed of extruded material with the reflective surfaces plated on the slats. Other materials and manufacturing methods can be employed to obtain reflective surfaces for practicing the invention.

Means are provided for mounting the slats in relation to the direct rays of the sun, where the slats are aligned to pass the direct rays of, for example, the winter sun between the wider faces of the slats. The reflective surfaces on each slat are also aligned to reflect back the direct rays of, for example, the summer sun. The means for mounting the slats in the frame includes one or more spacer members having complementary slots formed therein for engagement with corresponding slots formed in the slats. The slots formed in the spacer members are formed with a predetermined orientation so that the slats can be aligned to pass the direct rays of the sun coming from a first predetermined direction, such as from the direction of the winter rays of the sun. The slats are also aligned so that the reflective surfaces formed on the slats reflect the rays of the sun coming from the second predetermined direction, such as from the direction of the summer sun. A key concept is that direct radiation from the sun is controlled, while indirect radiation is allowed to enter the structure.

The slats can be fixed, for example, in a skylight or variable such as in a Venetian blind.

Deflection means are provided for deflecting the direct rays of the sun which pass between the faces of the slats into the space beneath the barrier. The deflection means includes a reflective surface which extends from the trailing edge of a slat to deflect the direct rays passing through the faces of the slats into a more vertical direction into the space beneath the barrier. The reflective surface extends at an angle from the trailing edge of a respective slat.

The invention provides an energy efficient skylight assembly which may include a frame for mounting the skylight assembly to a larger structure, such as a building or dwelling. In this arrangement, the slats have slots formed therein. The means for mounting the slats in the frame includes one or more spacer members, which have complementary slots formed therein for engagement with corresponding slots formed in the slats.

The skylight assembly includes a transparent cover and a plate of transparent material to seal the skylight from the interior of the building.

The invention provides a method of providing a seasonably variable barrier for solar energy. The method includes the step of mounting a plurality of slat members in a mounting frame, where each slat member has a thin cross-section and a larger surface having means formed thereupon for reflecting the rays of the summer sun. The slat members are oriented and spaced apart to pass the direct rays of the winter sunlight therebetween. The slats are further oriented to reflect back the direct rays of the summer sun out of the skylight assembly.

A system is provided for selectively concentrating solar energy through an opening in a structure. The system uses a Fresnel lens oriented to concentrate direct solar energy: for example, using a linear-focus design to concentrate the sunlight in a line. A first reflecting surface receives direct summer sunlight from the Fresnel lens and reflects the sunlight back out of the system. A second reflecting surface receives direct winter sunlight from the Fresnel lens and reflects the sunlight through the opening into the structure. The system may include a movable reflective shutter for covering the opening in the structure and for reflecting sunlight back out of the system. A motor and a motor control unit are provided to move the movable shutter and temperature-sensitive means for controlling the motor control. A direct mechanical actuator means can be used for moving the shutter. Means are also provided for automatically orienting the Fresnel lens to a predetermined orientation with respect to the sun.

A method and a system for guiding sunlight from a skylight assembly are provided. A hollow tube has a first end for receiving sunlight from, for example, a skylight assembly and a second end for transmitting sunlight to a utilization point, such as another floor within a building. The hollow tube has internal walls for reflecting light and contains a sunlight-transmitting fluid. The ends of the tube are capped with caps, or plates, formed of sunlight-transparent material. In one embodiment of the invention, the index of refraction of the tube is less than the index of refraction of the fluid contained in the tube such that total internal reflection occurs to guide light from the one end of the tube to the second end of the tube. Two or more hollow tubes can be positioned respectively end-to-end to provide an extended system for transmitting sunlight. The hollow tube can have a straight internal wall or a curved internal wall for guiding sunlight passing through the hollow tube in a curved path.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
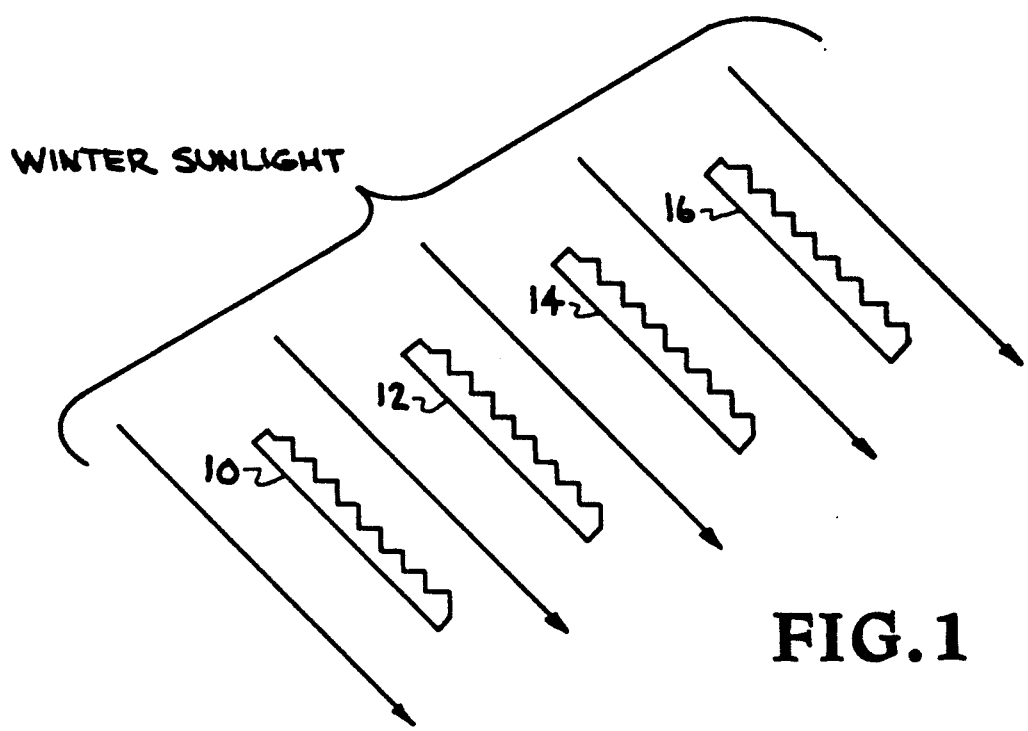
FIG. 1 is a side view of a number of externally reflective slats according to the invention, which are shown fixed in position and operating to permit direct winter solar energy to pass therethrough.
Figure 2:
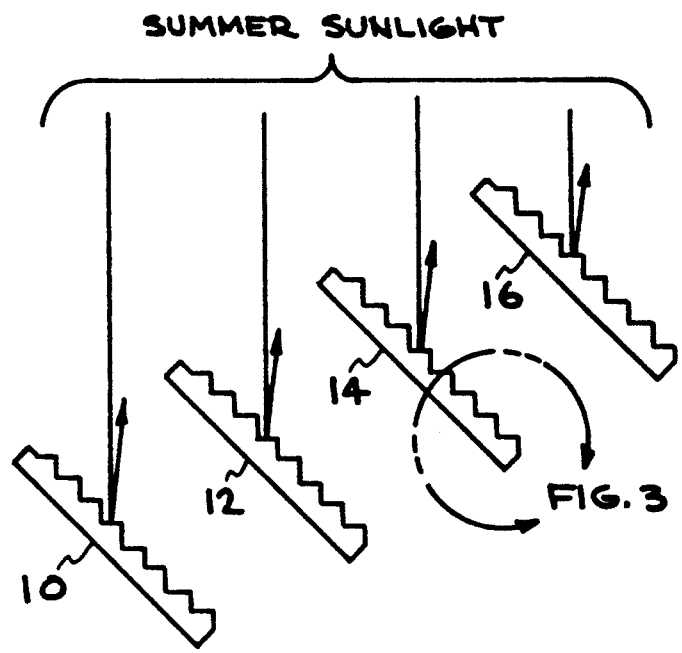
FIG. 2 is a side view of the externally reflective slats of FIG. 1, shown reflecting backwards the direct rays of the sun.

FIG. 1 and FIG. 2 show the principle of operation of an energy efficient skylight according to the invention.

FIG. 1 shows an end view of a number of externally reflective slats 10, 12, 14, 16 fixed in position with respect to the rays of winter sunlight. These slats may be part of a skylight assembly to be illustrated hereinbelow. For purposes of illustration of the invention, the rays of winter sunlight are shown for the winter solstice, where, for a latitude of 23.5 degrees, they are inclined at an angle of about 47 degrees from vertical. When the sun is positioned at this angle with respect to the slats, the winter rays pass through the space between the slats, as indicated in the figure. In this manner, direct light and heat energy from the sun enter, for example, a building or other structure.

Figure 1A:
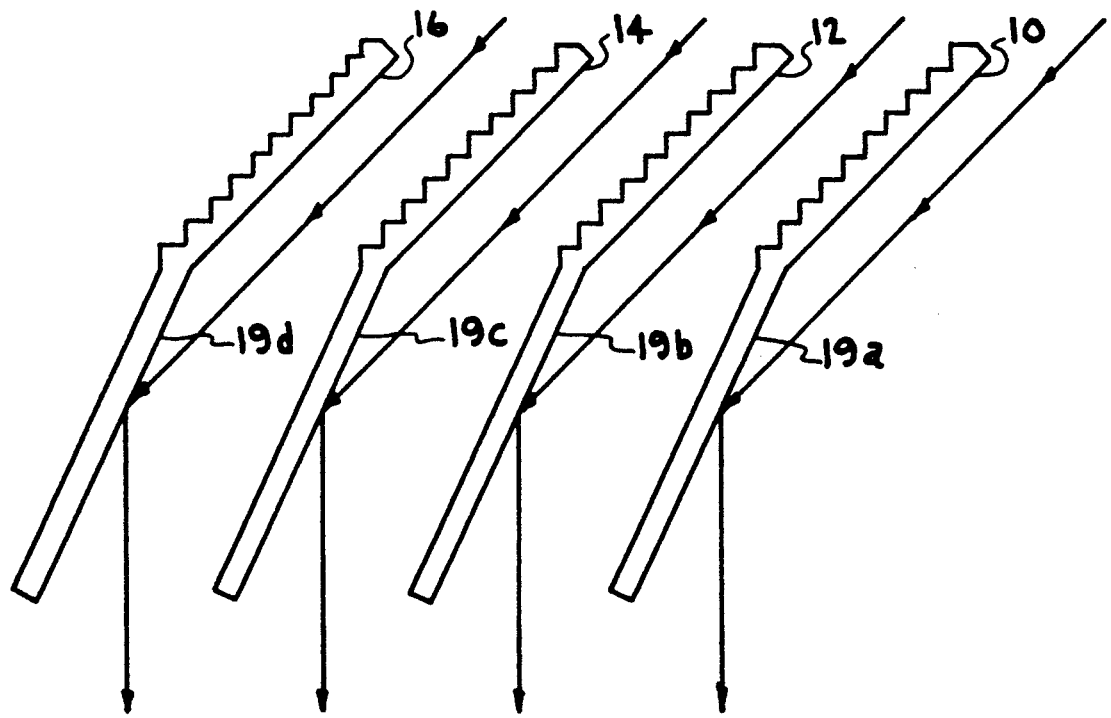
FIG. 1A is a side view of an alternative design of a number of reflective slats where auxiliary light deflectors are provided for deflecting the direct winter rays of the sun more vertically downward into the space beneath the slats.

FIG. 1A shows the slats 10, 12, 14, 16 with auxiliary light deflector portions, typically shown in reverse as 19a, 19b, 19c, 19d. In this embodiment, these deflectors have smooth, reflective surfaces which extend from the trailing edge of the respective slats at an angle as indicated in the figure. The deflectors are provided for deflecting the direct winter rays of the sun, which pass between the slats, into a direction which is more vertically downward into the space beneath the slats.

FIG. 2 shows an end view of the same externally reflective slats 10, 12, 14, 16 fixed in position with respect to the rays of summer sunlight. For purposes of illustration of the invention, the rays of summer sunlight are shown for the summer solstice and are vertically aligned. When the sun is positioned at this angle with respect to the slats, the winter rays pass through the space between the slats, as indicated in the Figure. In this orientation of slats and rays, the rays are deflected back from the exterior surfaces of the slats, as indicated in the drawings. These direct rays from the sun are thereby prevented from entering the space beneath the slats. In this manner, direct light and heat energy from the summer sun are prevented from entering, for example, a building or other structure. Note that in the summertime some amount of indirect sunlight, that is, sunlight which has been scattered and which is not vertically aligned, can still enter the space beneath the slats to provide natural lighting.

Figure 3:
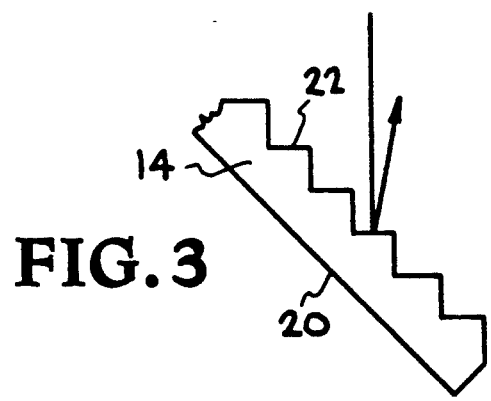
FIG. 3 is an enlarged side view of an externally reflective slat according to the invention.

FIG. 3 shows an enlarged end view of a typical slat 10. As shown in the figure, the slat 10 is relatively thin in cross-section with respect to its width. The rear surface 20, that is, the surface which is located away from the sun, of the slat is shown as flat in this embodiment of the invention. The rear surface alternatively can have a different geometry.

The reflective front surface of the slat, that, is the surface which is nearest the sun, is formed as a series of triangulated surfaces with the angles chosen to maximize reflection of the rays of the summer sun. The slat 10 is formed, for example, from extruded plastic or metal material with a series of parallel V-grooves (typically shown as 22) formed in the front surface of the slat, where the V-grooves extend along the width, or horizontal, dimension of the slat. After forming, the slat is coated with a reflective coating.

When the slats are assembled into, for example, a skylight, they are adjusted to be oriented at an appropriate angle for a particular latitude and roof angle. FIGS. 1 and 2 have slats adjusted, for example, for a latitude of approximately 23.5 degrees. The slats are enclosed in a top and bottom glazing to minimize convective heat loss.

Note that an important feature of the slats and their arrangement is that the direct solar energy is reflected back out of the arrangement. In contrast, a system which simply absorbs the direct sunlight, such as an inside venetian blind assembly, still heats the inside of a building.

Figure 4:
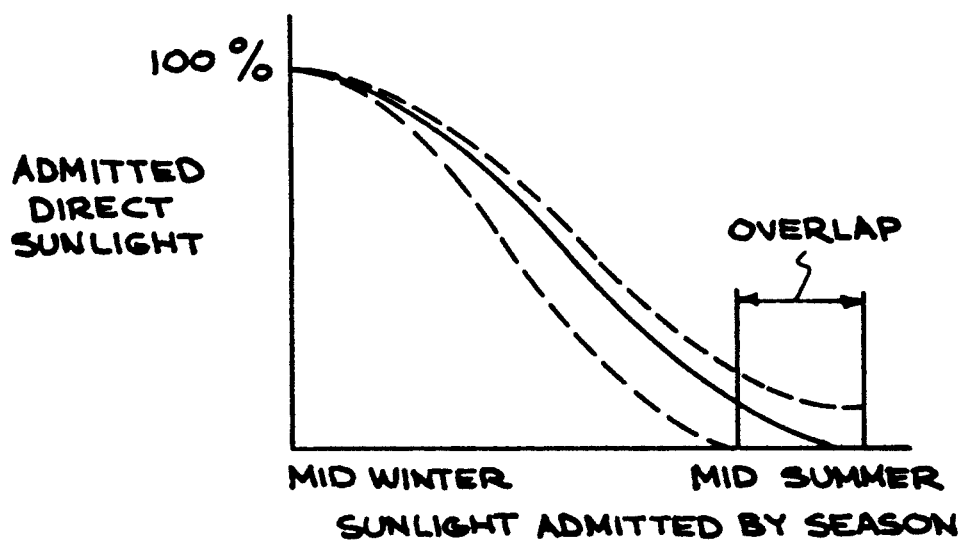
FIG. 4 is a graph plotting the transmission of direct solar energy through an array of externally reflective slats according to the invention as a function of the seasons.

FIG. 4 shows how a skylight, which is formed using, for example, an array of the slats 10–16, progressively admits or blocks direct solar energy as a function of the seasons. For the winter season, the admitted amount of available direct solar energy is near maximum. For the summer season, the admitted amount of available direct solar energy is near minimum.

Figure 5:
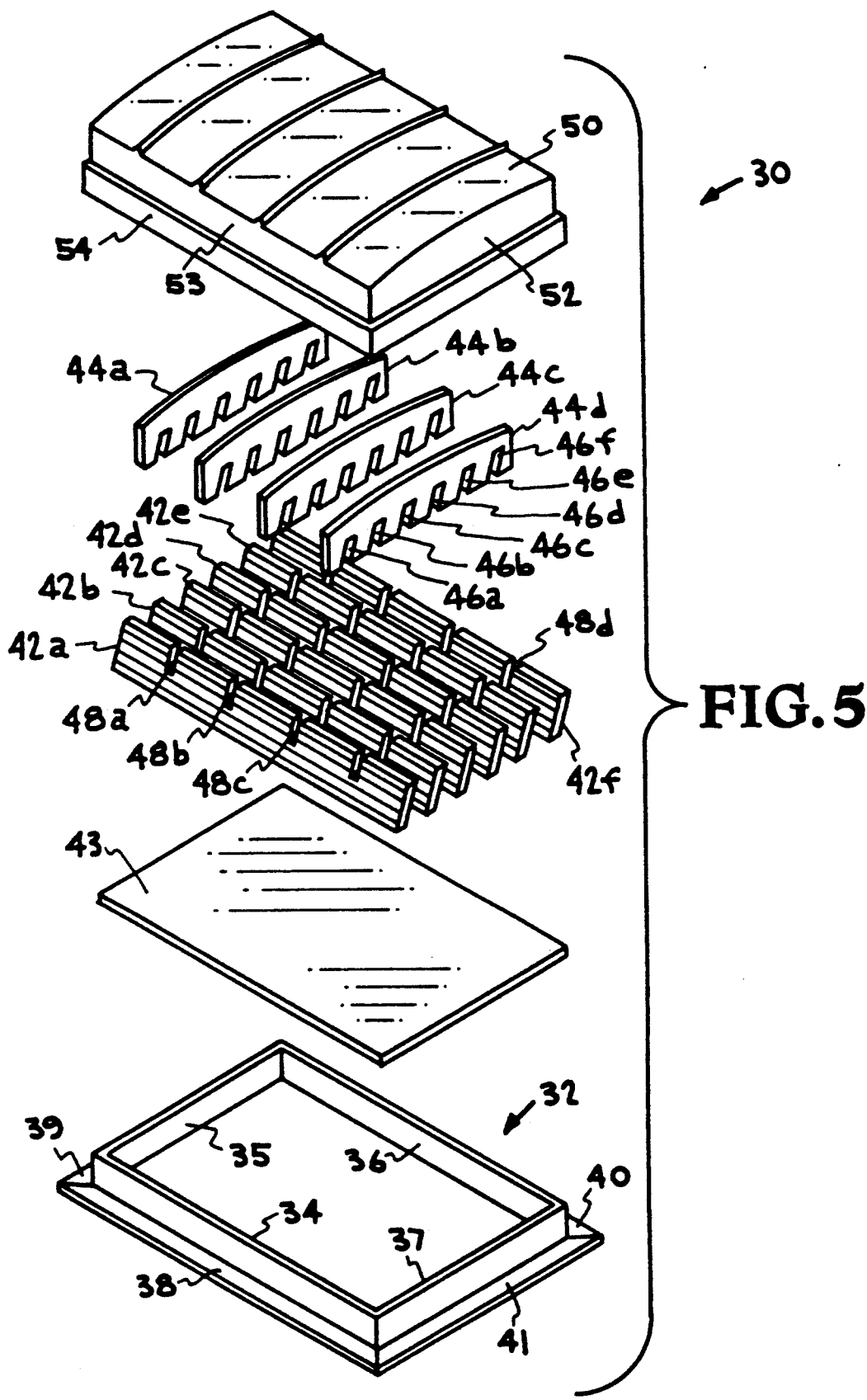
FIG. 5 is an exploded, perspective view of an energy efficient skylight using externally reflective slats according to the invention.

FIG. 5 shows an example of an energy efficient skylight design assembly 30 using externally reflective slats according to the invention.

The skylight assembly 30 includes a rectangular metal frame 32 formed of a connected series of upwardly extending sides walls 34, 35, 36, 37. Each side wall has extending sidewardly therefrom a mounting flange 38, 39, 40, 41 for mounting the skylight assembly to a roof or deck, as required. A clear, rectangular bottom plate 41, which is formed of a material such as glass or Lucite, fits within the frame 32.

A series of reflective slats 42a, 42b, 42c, 42d, 42e, 42f are positioned over the bottom plate 40. The reflective slats 42a, 42b, 42c, 42d, 42e, 42f are similar to the externally reflective slat 10 shown in detail with respect to Figure 3. The slats are relatively thin in cross-section and the reflective front surface of a slats is formed as a series of triangulated, or ridged, surfaces with the angles chosen to maximize reflection of the rays of the summer sun. The slats are formed, for example, from extruded plastic or metal material with a series of parallel V-grooves formed in their front surfaces, where the V-grooves extend along the width, or horizontal, dimension of the slat. The V-grooves are coated with a reflective coating.

When the slats are assembled into, for example, a skylight, they are positioned to be spaced apart and adjusted to have an angular orientation at an appropriate angle with respect to the direct rays of the sun for a particular latitude and roof angle, as shown, for example, by the Figure. Positioning and orientation of the slats is accomplished by providing a group of clear spacers 44a, 44b, 44c, 44d, each of which has a series of half-slots, which are typically shown in the spacer 44d as 46a, 46b, 46c, 46d, 46e, 46f. These half-slots in the slats are angled for a particular latitude and roof angle. The slats 42a, 42b, 42c, 42d, 42e, 42f have corresponding half-slots formed therein, as typically shown in the slat 42a as 48a, 48b, 48c, 48d. The corresponding half-slots in the slats and spacers engage to properly align the slats 42a, 42b, 42c, 42d, 42e, 42f for a particular latitude and roof angle.

A clear cover 50 fits over the slat and spacer assembly to protect the reflective slats and the roof opening from moisture and to seal the roof opening. The cover 50 has a rectangular slightly-domed top 52 with suitable reinforcement ribs formed therein. Lower sidewalls (typically shown as 52,53) extend downwardly from the domed top 50 and terminate in a rectangular downwardly-extending peripheral lip 54, which extends around the lower edge of the cover, as shown in the Figure. The roof lip 54 fits around the upwardly extending sides walls 34, 35, 36, 37 of the frame 32. The roof lip is fastened to the frame 32 using fastening means such as screws which extend through holes in the roof lip and the sidewalls of the frame 32. The roof lip and the sidewalls of the frames are not sealed to allow the skylight to breathe and prevent moisture buildup.

In one preferred embodiment of the invention, the cover 50 is vacuum-formed of a clear acrylic material with a thickness of ⅛ or 3/16 inches. The reflective slats 42a, 42b, 42c, 42d, 42e, 42f are extruded from acrylic material and the V-grooves are plated with a reflective material such as aluminum. The half-slots 42a, 42b, 42c, 42d, 42e, 42f are punched into the slats. The clear spacers 44a, 44b, 44c, 44d are formed of 1/16 inch clear acrylic material. The bottom cover 40 is formed of 3/16 or ⅛ inch clear acrylic material. Adhesive may be used. The reflective slats and the spacers can be supplied as a kit to be assembled by an installer, depending upon the latitude and the angle of the roof. Alternatively, an assembly can be pre-assembled at the factory.

Figure 6:
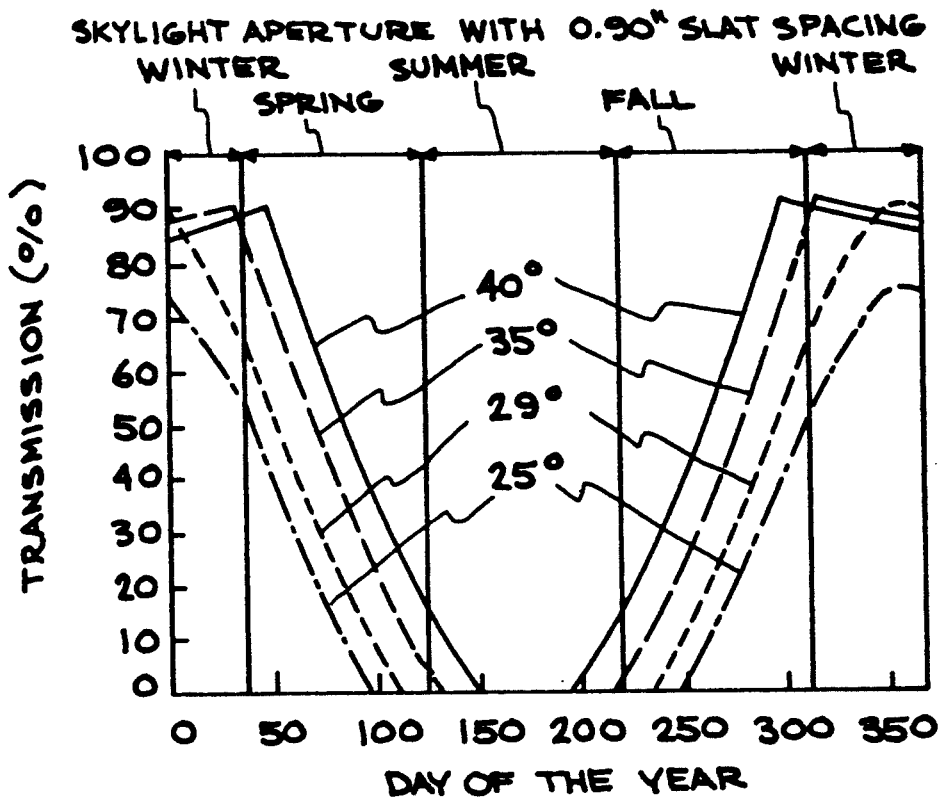
FIG. 6 is a graph showing various plots of solar energy transmission versus the day of the year with the slat angle as a parameter for the skylight design of FIG. 5.

FIG. 6 illustrates the transmission percentage of a skylight as a function of the day of the year for various angles of the slats. It can be seen that the transmission characteristics can be modified by changing the angle of the slats to obtain various transmission profiles.

Figure 7:
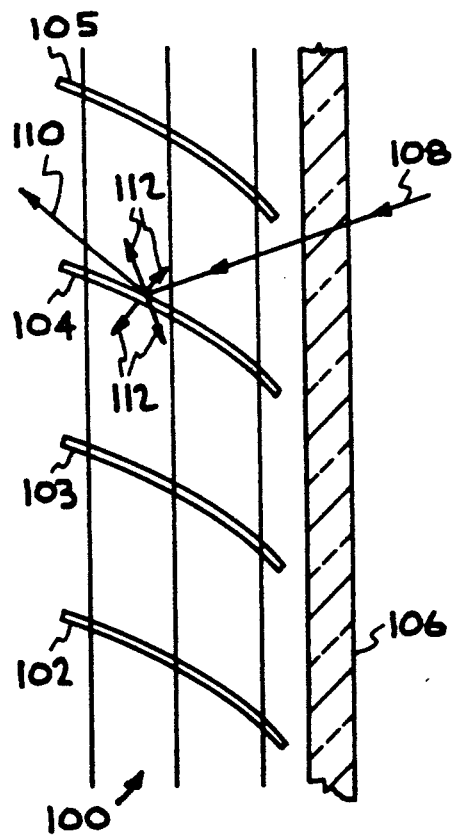
FIG. 7 is a side view of a conventional venetian blind located behind a window pane through which direct summer sunlight is passing.

FIG. 7 shows an array 100 of conventional venetian-blind slats 102, 103, 104, 105 located behind a conventional glass window pane 106 of a building. A typical ray of direct summer sunlight energy 108 passes through the window pane 106 and strikes the upper surface of the slat 104. One part of the sunlight energy is reflected into the building, as represented by the reflected ray 110. The other part of the sunlight energy is converted at the surface of the slat 104 into heat energy, as represented by the rays 112, which heats the air within the building.

Figure 8:
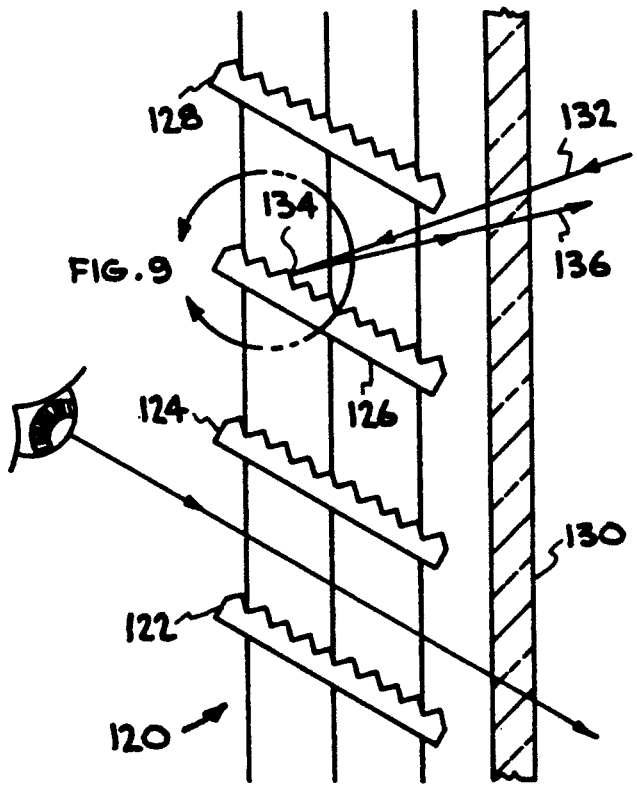
FIG. 8 is a side view of a venetian blind using reflective slats according to the invention, where the slats are located behind a window pane through which direct summer sunlight passes and where the direct summer sunlight is reflected from the reflective exterior surface of the reflective slats.

FIG. 8 shows an array 120 of reflective venetian blind slats 122, 124, 126, 128 according to the invention. The slats are shown located behind a glass window pane 130. A typical ray of direct sunlight energy 132 passes through the window pane 130 and is reflected out of the building from one of the series of reflective surface 134 formed on the surface of the reflective slat 126. The slats 122, 124, 126, 128 are similar to the slats described in connection with FIGS. 1,2,3 described hereinabove.

Figure 9:
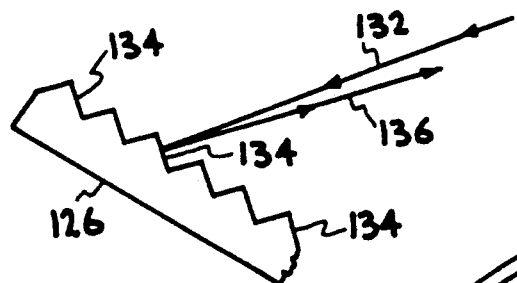
FIG. 9 is an enlarged side view of an externally reflective slat of FIG. 8.

FIG. 9 shows an enlarged view of the reflective surface 134 of the reflective slat of FIG. 8, showing the typical ray of direct summer sunlight energy 132 being reflected as a ray 136 from one of the reflective surfaces 134 formed in the surface of the slat.

Figure 10:
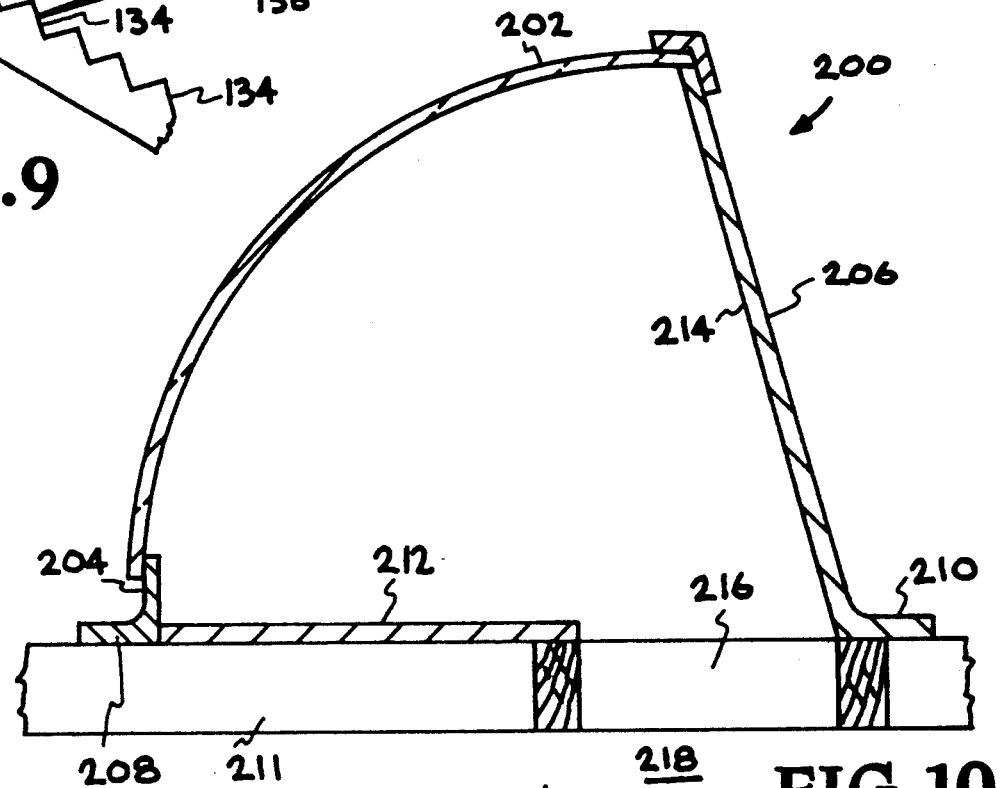
FIG. 10 is a sectional view of an energy efficient concentrating skylight assembly using a Fresnel lens.

FIG. 10 shows a sectional view of an energy efficient concentrating skylight assembly 200. The skylight assembly extends along an axis which is perpendicular to the plane of the Figure, where each section is similar to that shown in FIG. 10. Each end of the assembly is covered with an end plate.

The concentrating skylight assembly 200 uses a linear-focus Fresnel lens 202 to concentrate direct solar radiation into a building when additional heat is needed during the winter months. During the summer months, when additional heating is undesirable, the skylight assembly 200 directs solar radiation away from the building.

The concentrating skylight assembly uses a linear-focused Fresnel lens 202 and an enclosure formed of a vertically extending lower enclosure side 204 and a larger, upwardly-angled enclosure side 206 as shown in the Figure. Respective horizontally-extending flange portions 208, 210 extend from the respective enclosure sides 204, 206 to form a housing to seal out weather and for attachment of the assembly to the roof or wall of a structure 212, as indicated in the figure. A horizontal reflective surface 212 lies within the housing beneath the Fresnel lens. The inside surface 214 of the enclosure side 206 is reflective. The two reflective surfaces 212, 214 are used with the Fresnel lens 202 to concentrate direct solar radiation. An opening 216 to the room, or space 218, beneath the assembly is located in a position according to the geometry of the optical system. Different geometries can be provided for different latitudes or, alternatively, the skylight can be designed to be adjustable by means for changing the angle of the reflecting side or the position of the room opening.

A Fresnel lens is a thin lens which has a surface formed of a series of simple lens sections and which provides a short focal length with a large width. The linear-focus Fresnel lenses used, for example, in the particular embodiments of the invention disclosed herein, have longitudinal symmetry so that the sunlight tends to be concentrated in a line. The invention is not limited to linear-focus lenses and other focus configurations, such as point-focused lenses can be used.

Figure 11:
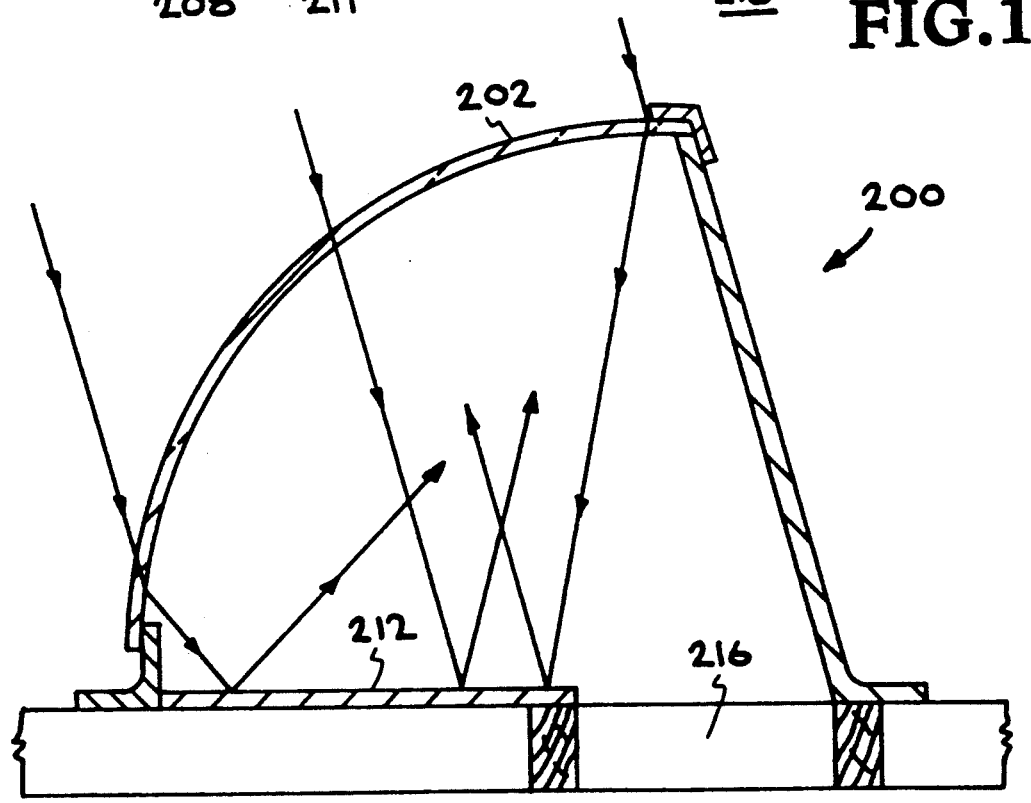
FIG. 11 is a sectional view of an energy-efficient concentrating skylight assembly using a Fresnel lens which directs solar energy from the direct summer sun falling on the assembly so that minimal direct solar energy passes into a building space beneath the assembly, while indirect light is allowed to enter the building.

FIG. 11 shows the energy efficient concentrating skylight assembly 200 using the Fresnel lens 202 to direct solar energy from the direct summer sun so that it is reflected from the horizontal reflecting surface 212, as shown in the Figure. With the sun at this angle, minimal solar energy passes through the opening 216 into the space beneath the assembly. During the summer months, the steep angle of the sun causes the direct solar radiation to be reflected away from the building as shown in FIG. 11.

Figure 12:
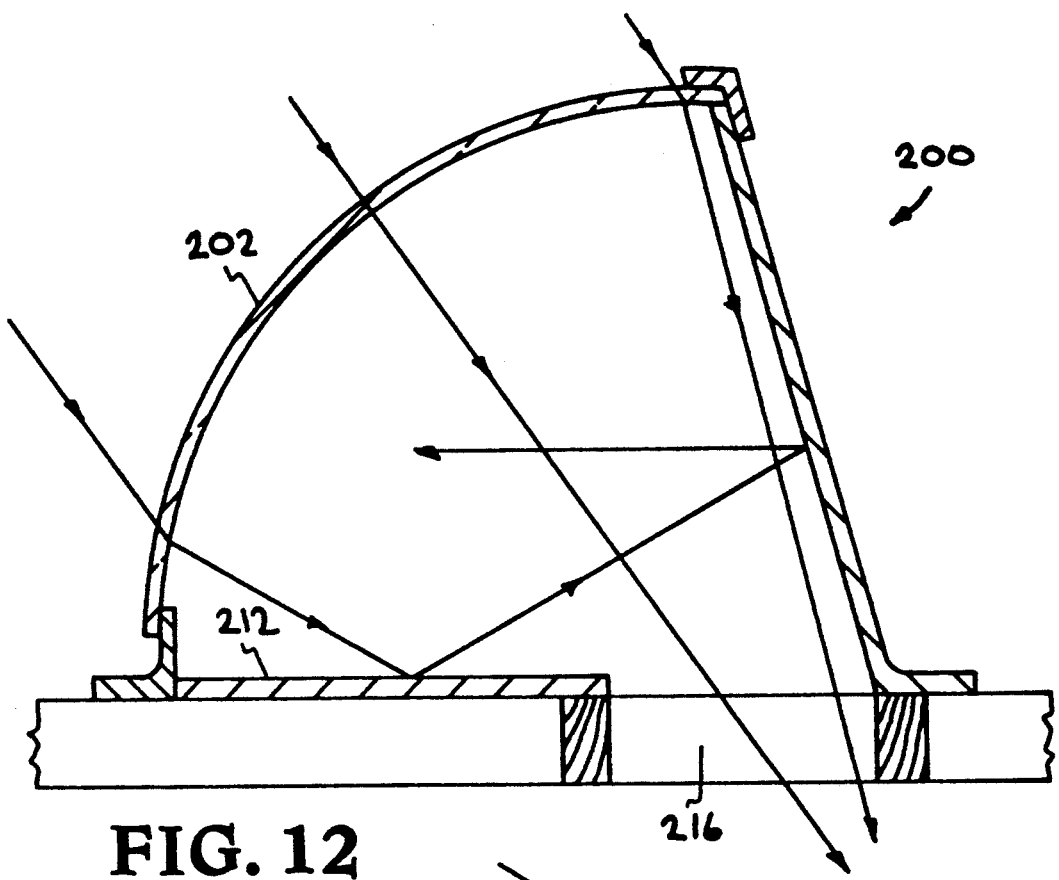
FIG. 12 is a sectional view of an energy-efficient concentrating skylight assembly using a Fresnel lens which directs solar energy from the equinox sun falling on the assembly so that some of the direct solar energy passes into a space beneath the assembly.

FIG. 12 shows the energy efficient concentrating skylight assembly 200 using the Fresnel lens 202 to direct solar energy from the equinox sun so that some of the solar energy passes through the opening 216 into the space beneath the assembly. During the Spring and Autumn months, the angle of the sun is lower and the skylight assembly directs the focal point of the fixed lens toward the room opening 216 as shown in FIG. 12.

Figure 13:
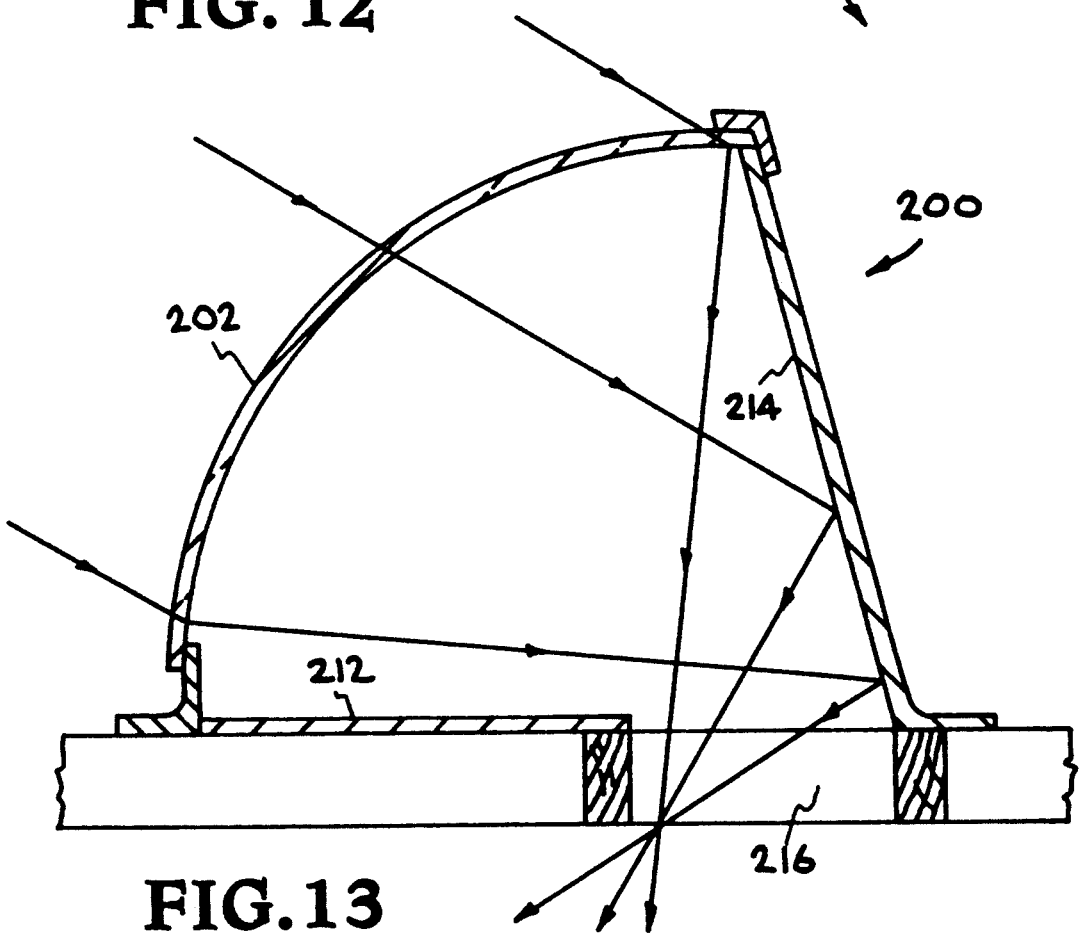
FIG. 13 is a sectional view of an energy-efficient concentrating skylight assembly using a Fresnel lens which directs solar energy from the winter sun falling on the assembly so that maximum direct solar energy passes into a space beneath the assembly.

FIG. 13 shows the energy efficient concentrating skylight assembly 200 using the Fresnel lens 202 to direct solar energy from the winter sun falling on the assembly from the reflective side 214 through the opening 216 so that maximum solar energy passes into the space beneath the assembly. The angle of the reflective side 214 of the enclosure side 206 is set to optimize reflection of the winter rays for a particular latitude. In the winter months, all of the direct rays of the sun enter the room, as shown in FIG. 13.

The concentrating skylight has several advantages. One advantage is that the concentrating skylight provides more light to the opening than would be available from a standard skylight. This is especially useful in applications where the building structure or other limitations may limit the size of the room opening. Another advantage is that the concentrating skylight passively adjusts the available direct sunlight to match the seasonal requirements.

Figure 14:
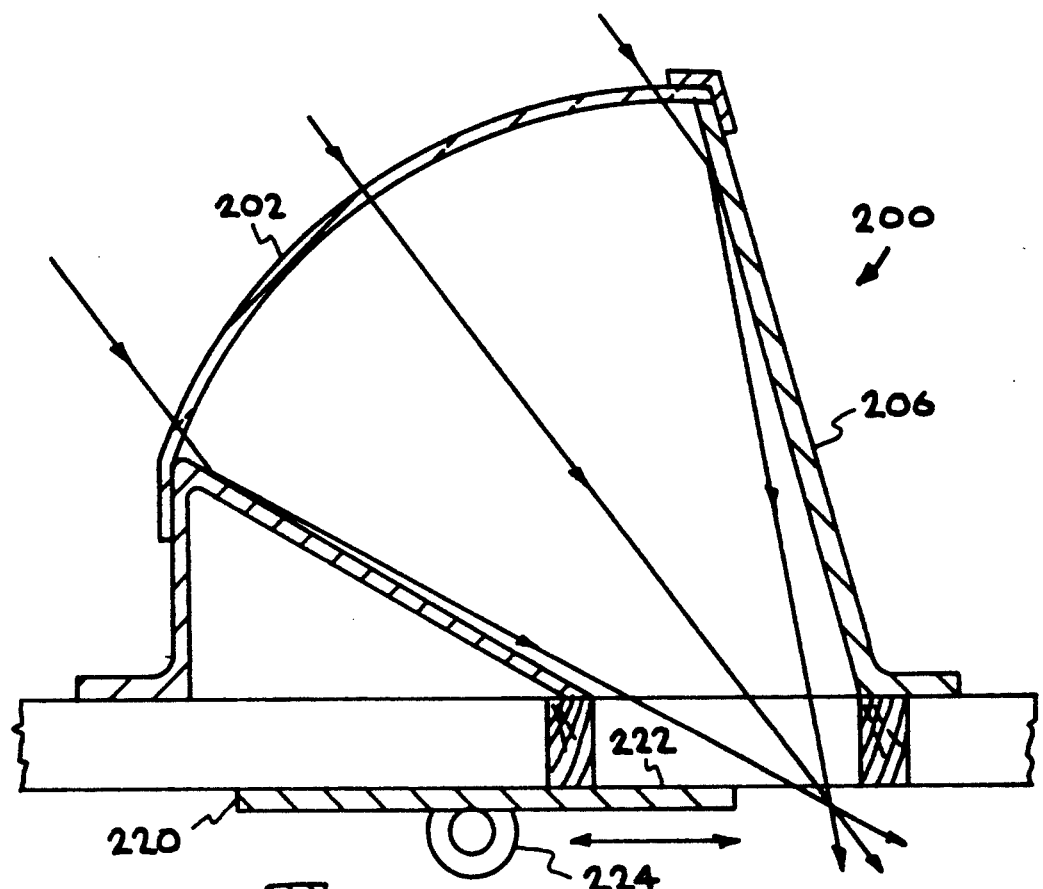
FIG. 14 is a sectional view of an energy-efficient concentrating skylight assembly using a Fresnel lens and with a movable reflective shutter to control the amount of sunlight that passes into a space beneath the assembly.

FIG. 14 shows another embodiment of an energy efficient concentrating skylight assembly 200 utilizing the Fresnel lens 202 and a movable shutter 220 having a reflective top surface 222 to control the amount of sunlight that passes through the opening 216 into the space beneath the assembly. In this case, the movable reflective shutter is moved horizontally by a motor 224 to control the amount of light entering the room. When the shutter is open, light is allowed to enter the room. When the shutter is closed, light is reflected away from the building. Thus, intermediate positions allow varying amounts of direct sunlight to enter the room.

Figure 15:
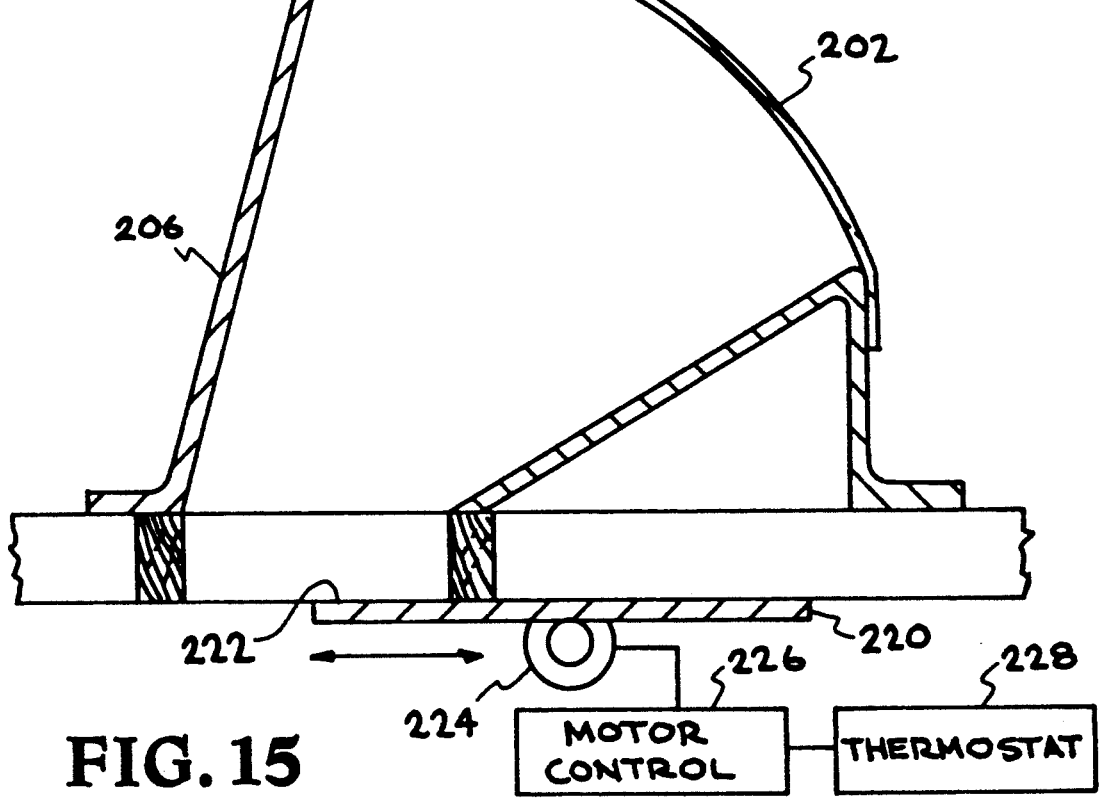
FIG. 15 is a sectional view of an energy-efficient concentrating skylight assembly with a Fresnel lens and with a movable reflective shutter operated by a motor controlled by a motor control unit and a thermostat.

FIG. 15 shows a reversed view of the energy efficient concentrating skylight assembly with the Fresnel lens 202 and with a movable reflective shutter which is operated by the motor 224. The motor 224 is moved horizontally by a motor control unit 226 connected to a thermostat 228. The reflective shutter 220 can be controlled according to need through the use of a thermostat or other control, a controlling circuit, and motor as shown in FIG. 15. It may also be controlled by a direct mechanical actuator such as a bimetal strip, expanding gas actuator, or other means. The shutter may be a sliding reflector as shown in the figure, or, alternatively, by a hinged or rotating flap, a louvered shutter, or other means.

This embodiment of the invention provides several advantages. The concentrating skylight provides more light to the opening than would be available from a standard skylight. This is especially useful in applications where the building structure or other limitations may limit the size of the room opening. Another advantage is that the invention provides a means for controlling the available direct sunlight at will, allowing maximum energy efficiency. Another advantage is that the active elements are accessible from inside the building.

Figure 16:
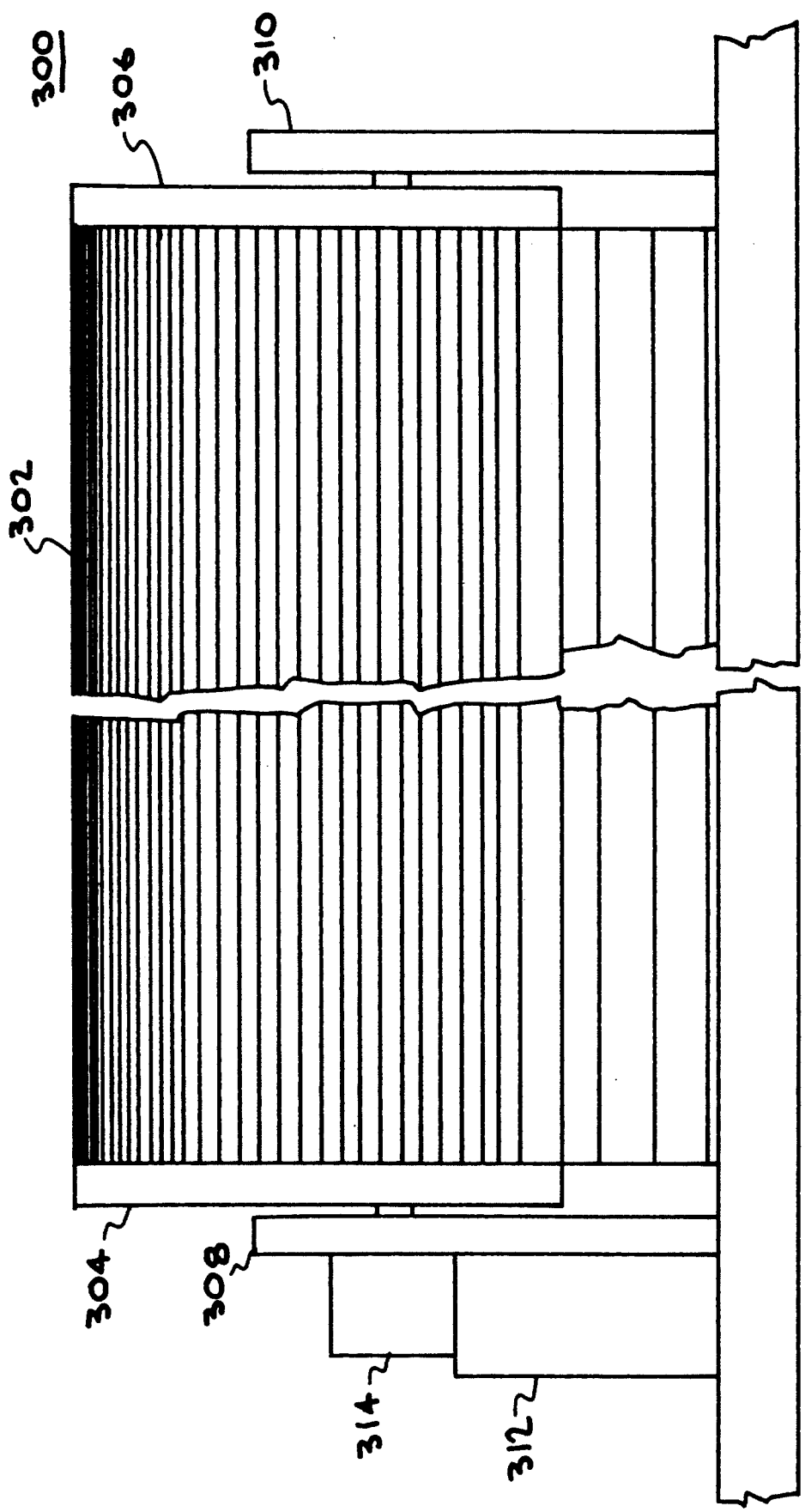
FIG. 16 is a front elevation view of an energy-efficient concentrating skylight assembly with a linear-focus Fresnel lens which is pivotable to track the position of the sun when direct solar energy is needed.

FIG. 16 shows another embodiment of an energy-efficient concentrating skylight assembly 300, which has a Fresnel lens 302 which is pivotably mounted to track the position of the sun when direct solar energy is needed. In this embodiment of the invention, the Fresnel lens is fixed to end plates 304, 306, which are pivoted on respective pivot supports 308, 310 to track the sun when direct sunlight is required. The position of the linear-focused Fresnel lens 302 is controlled by a motor 312 through a transmission 314.

Figure 17:
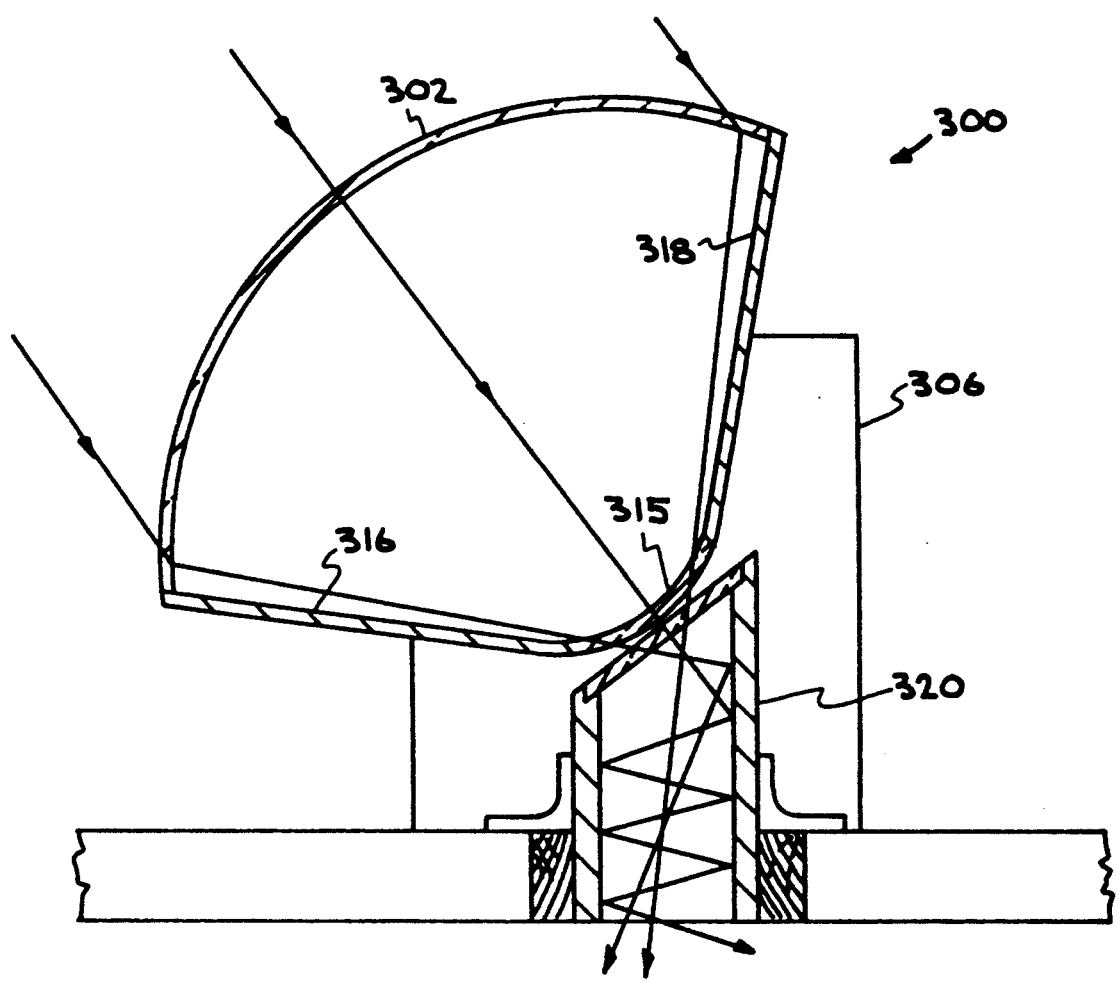
FIG. 17 is a side view of a concentrating skylight assembly with a Fresnel lens showing direct sunlight being directed into the space beneath the skylight.

FIG. 17 is a sectional view of the concentrating skylight assembly 300 of FIG. 16, showing direct sunlight being directed through a transparent region 315 of the assembly and into the space beneath the skylight through a room opening. The enclosure for the Fresnel lens 302 is provided to increase torsional stiffness and protect the Fresnel facets of the lens. Reflective sides 316, 318 are added to the enclosure sides to improve the acceptance angle of the optical system, but the housing in the focal area of the optical path in the vicinity of the region 315 is left transparent. A transparent window may be provided to the room opening to seal out the weather. A light-reflective tube 320 assembly 20 (described hereinbelow) guides light into the room.

Figure 18:
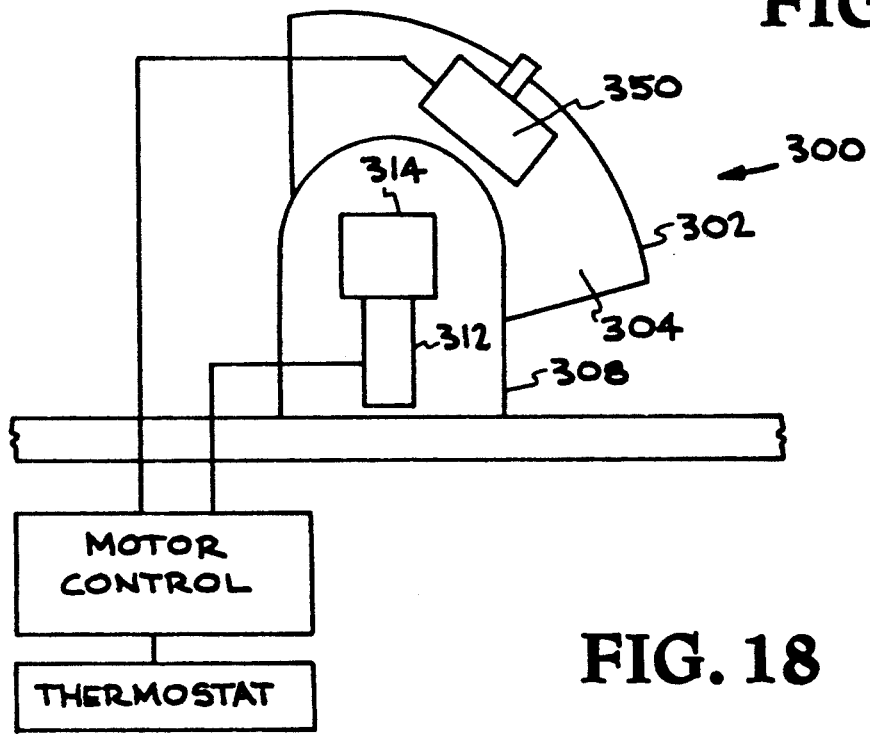
FIG. 18 is a side view of a skylight assembly with a Fresnel lens and having an automatic tracking capability.

FIG. 18 diagrammatically shows the skylight assembly 300 with an automatic tracking capability using a means for tracking the sun's position such as a shadow band sensor 350, or a clock. Using an automatic controller such as a motor-transmission assembly 312, 314, in connection with a device for sensing energy needs, such as a room thermostat, the skylight assembly can be pivoted on and off the current solar angle to provide greater or less direct sunlight to the room as required. These functions can also be provided by many other means such as mechanical or thermal actuators.

The pivoting skylight can be adjusted by manual means or can be provided with a means for automatic adjustment such as the motor and transmission assembly 312, 314. A direct mechanical actuator such as a bimetal strip, expanding gas actuator, or other means can also be used. If the skylight is aligned to pivot on the North/South axis, the angle need only be adjusted several times a year to provide direct sunlight to the room. If the skylight is aligned to the East/West axis, the angle must be adjusted several times an hour to provide direct sunlight to the room.

There are several advantages to this embodiment of the invention in addition to providing more light to the opening than would be available from a standard skylight. This is especially useful in applications where it is desired to provide daylight to floors below a top floor. In those applications light can be concentrated into light guides (described hereinbelow) to carry daylight to floors below the top floor of a building.

Figure 19:
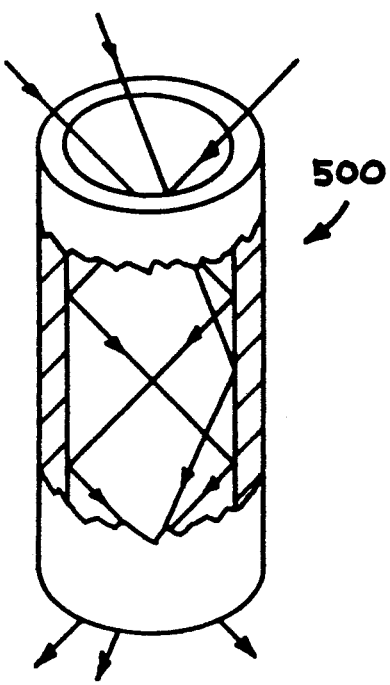
FIG. 19 is a diagrammatic view of a sunlight guide using total internal reflection to guide sunlight from a skylight to a utilization point with a building.

FIG. 19 diagrammatically shows a sunlight guide 500 using total internal reflection to guide sunlight, for example, from a skylight to a utilization point within a building. The concentrating skylight can be combined with this sunlight guide to provide daylight to floors beneath the top floor of a building.

Figure 20:
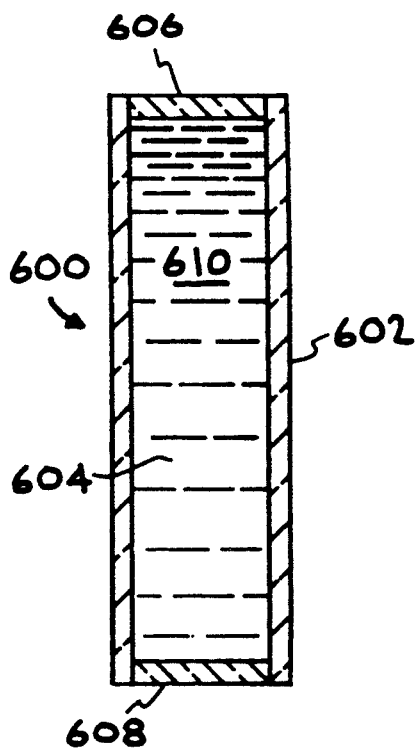
FIG. 20 is a sectional view of a hollow, fluid-filled tube with sunlight-transparent light caps at each end.

FIG. 20 shows a sunlight guide assembly 600 which includes a hollow transparent tube 602 which has a hollow interior space 604 defined by the interior wall of the tube. The tube 602 is capped at both ends by respective end caps, or plates 606, 608. The tube 602 and the end caps 606, 608 are formed of a transparent material such as a plastic or glass material. The tube 602 is filled with a transparent liquid 610, such as water or another suitably transparent liquid material. The length of a tube is limited by its ability to withstand the pressure created by a vertical column of liquid when the tube is vertically oriented.

For optimum performance, the index of refraction of the tube 602 and of the liquid 610 are chosen so that the tube has a lower index of refraction than that of the liquid 610. In that configuration, the assembly 600 operates as a large optical fiber, where total internal reflection occurs to guide light which enters one end of the tube to the second end of the tube.

Figure 21:
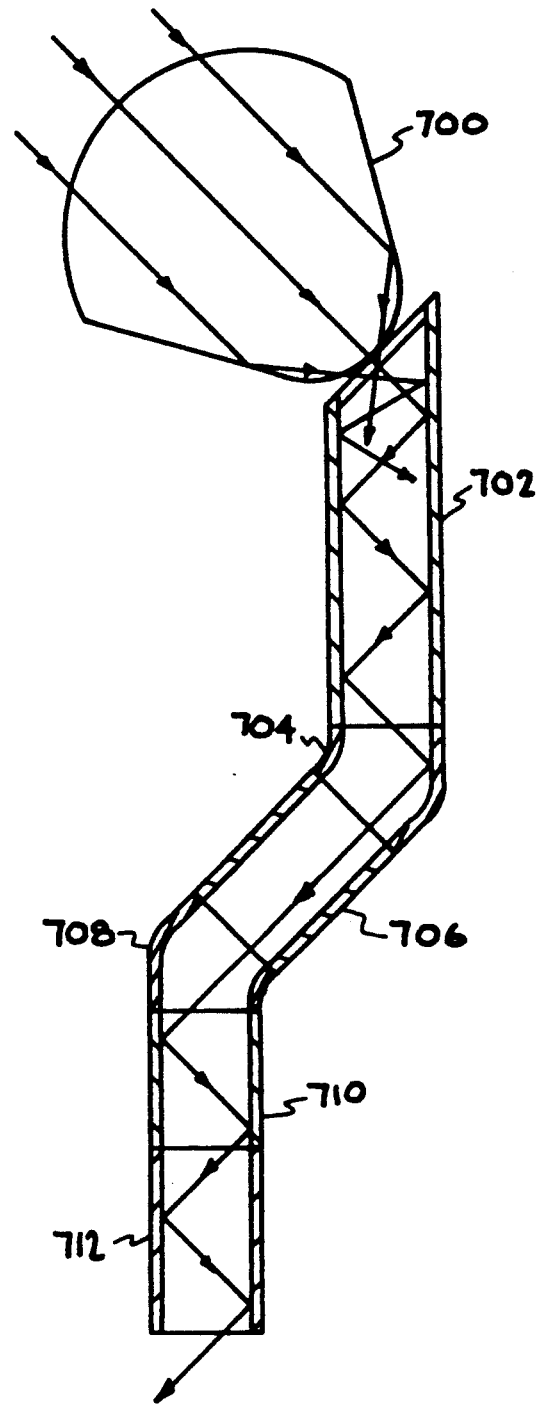
FIG. 21 is a sectional view of a concentrating skylight being used in connection with several sunlight guides connected in series.

FIG. 21 shows a concentrating skylight assembly 700 as described hereinabove which is being used in connection with several series-connected sunlight guide assemblies 702, 704, 706, 708, 720, 712. The assemblies, as shown, can be made straight or curved as needed to guide light to a desired destination. The assemblies can be stacked end-to-end to accommodate specific lighting requirements.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. An energy-efficient barrier for the direct rays of the sun, comprising:
    a plurality of slats, each slat having a thin cross-section and wider faces, wherein one of the faces has formed on it a plurality of reflective surfaces; and
    means for mounting the slats in orientation to the direct rays of the sun, with the slats being aligned to pass the direct rays of the sun, which are coming from a first direction, between the wider faces of the slats and with the plurality of reflective surfaces on each slat being aligned to reflect back the rays of the sun, which are coming from a second direction.

2. The barrier of claim 1 wherein said reflective surfaces on the one face of a slat include a plurality of parallel reflective surfaces which are oriented at an angle with respect to the face of the slat at an angle at which the reflective surfaces maximize reflection of the rays of the sun.

3. The barrier of claim 2 wherein the plurality of parallel reflective surfaces is formed as a series of ridges along the length of a slat.

4. The barrier of claim 2 wherein the reflective surfaces are formed as the treads of a series of stairsteps formed along the length of a slat.

5. The barrier of claim 2 wherein the slats are formed of extruded material and wherein the reflective surfaces are formed of reflective material plated on V-grooves formed in said slats.

6. The barrier of claim 1 wherein the slats include slots formed therein and wherein the means for mounting the slats in the frame includes one or more spacer members having complementary slots formed therein for engagement with corresponding slots formed in the slats.

7. The barrier of claim 6 wherein the spacer members are thin slats, and wherein the slots formed in the spacer members are formed with a predetermined orientation so that the slats are aligned to pass rays of the sun coming from the first predetermined direction and such that reflective surfaces formed on the slats reflect the rays of the sun coming from the second predetermined direction.

8. The barrier of claim 1 wherein the slats are assembled as a Venetian blind.

9. The barrier of claim 1 including means for deflecting the direct rays of the sun which pass between the faces of the slats into the space beneath the barrier.

10. The barrier of claim 9 wherein the means for deflecting includes a reflective surface which extends from the trailing edge of a slat to deflect the direct rays passing through the faces of the slats into a more vertical direction into the space beneath the barrier.

11. The barrier of claim 10 wherein the reflective surface extends at an angle from the trailing edge of a respective slat.

12. The barrier of claim 1 including means for guiding sunlight passing through the barrier to a utilization point.

13. The barrier of claim 12 wherein the means for guiding sunlight passing through the barrier to a utilization point includes:
    a hollow tube having a hollow interior and having a first end for receiving sunlight from said skylight assembly and a second end for transmitting sunlight, said tube having internal walls for reflecting light from said first end to said second end;
    sunlight-transmitting fluid contained in the hollow interior of said hollow tube, said fluid permitting light to be transmitted therethrough from said first end to said second end;
    first sunlight-transparent means for capping the first end of said tube; and
    second sunlight-transparent means for capping the second end of said tube.

14. The barrier of claim 13 wherein the index of refraction of the tube is less than the index of refraction of the fluid contained in the tube such that internal reflection occurs to guide light from the one end of the tube to the second end of the tube.

15. An energy efficient skylight assembly, comprising:
    a frame for mounting said skylight assembly to a larger structure;
    a plurality of slats, each slat having a thin cross-section and wider faces, wherein one of the faces has formed on it a plurality of reflective surfaces;
    means for mounting the slats in the frame wherein the slats are oriented to pass the rays of the winter sunlight between the wider faces of the slats and wherein the plurality of reflective surfaces on each slat are aligned to reflect back the rays of the summer sun out of the skylight assembly.

16. The skylight assembly of claim 15 wherein said reflective surfaces on a slat include a plurality of parallel reflective surfaces which are oriented at an angle with respect to the face of the slat at an angle at which the reflective surfaces maximize reflection of the rays of the summer sun.

17. The skylight assembly of claim 16 wherein the plurality of parallel reflective surfaces are formed as a series of ridges along the length of a slat.

18. The skylight assembly of claim 16 wherein the reflective surfaces are formed as the treads of a series of stairsteps formed along the length of the slat.

19. The skylight assembly of claim 16 wherein the slats are formed of extruded material and wherein the reflective surfaces are formed of reflective material plated on V-grooves formed in said slats.

20. The skylight assembly of claim 15 wherein the slats included slots formed therein and wherein the means for mounting the slats in the frame includes one or more spacer members having complementary slots formed therein for engagement with corresponding slots formed in the slats.

21. The skylight assembly of claim 20 wherein the spacer members are thin slats and wherein the slots formed in the spacer members are formed at an angle to orient the slats so that their faces are aligned to pass rays of the winter sun, such that the rays of the summer sun are reflected out of the skylight assembly by the reflective surfaces formed on the slats.

22. The skylight assembly of claim 15 including a transparent cover for covering the frame for mounting the skylight assembly to a larger structure.

23. The skylight assembly of claim 15 further comprising:

a plate of transparent material; and means for mounting the plate of transparent material to the frame to seal the skylight assembly from the plurality of slats.

24. The skylight assembly of claim 18 including means for deflecting the direct rays of the sun which pass between the faces of the slats into the space beneath the barrier.

25. The skylight assembly of claim 24 wherein the means for deflecting includes a reflective surface which extends from the trailing edge of a slat to deflect the direct rays passing through the faces of the slats into a more vertical direction into the space beneath the barrier.

26. The skylight assembly of claim 25 wherein the reflective surface extends at an angle from the trailing edge of a respective slat.

27. A method of providing a seasonably variable barrier for the rays of the sun, comprising the steps of:
mounting a plurality of slat members in a mounting frame, wherein each slat member has a thin cross-section and a larger surface having means formed thereupon for reflecting the rays of the summer sun;
orienting and spacing-apart the slat members to pass the rays of the winter sunlight therebetween; and
orienting the plurality of reflective surfaces on each slat to reflect back the rays of the summer sun out of the skylight assembly.

28. The method of claim 27 including the step of reflecting the rays of the summer sun from a slat by reflecting the rays of the summer sun from a plurality of parallel reflective surfaces which are oriented at an angle with respect to the face of the slats at an angle to substantially maximize reflection of the rays of the summer sun.

29. The method of claim 28, wherein the steps of orienting and spacing-apart the slat members and orienting the plurality of reflective surfaces on each slat to reflect back the rays of the summer sun out of the skylight assembly includes the the step of mounting the slats in a frame and using one or more spacer members.

30. The method of claim 27, wherein the step of reflecting back the rays of the summer sun out of the skylight assembly includes the step of reflecting the sun from a series of triangulated surfaces on the larger surface of the slat.

31. The method of claim 27 including the step of deflecting the direct rays of the sun which pass between the faces of the slats into the space beneath the barrier.

32. The method of claim 31 wherein the step of deflecting the direct rays of the sun which pass between the faces of the slats into the space beneath the barrier includes deflecting said direct rays from a reflective surface which extends from the trailing edge of a slat to deflect the direct rays into a more vertical direction into the space beneath the barrier.

33. The method of claim 27 including the step of guiding sunlight from the plurality of slat members to one or more locations.

34. The method of claim 33 including the steps of:
transmitting sunlight through a first sunlight-transparent end cap on a first end of a hollow tube;
guiding the sunlight transmitted through the first sunlight-transparent end cap into the hollow interior space of the hollow tube having an internal wall which reflects sunlight;
transmitting the sunlight which passes through the first sunlight-transparent end cap and through the hollow interior space of the hollow tube; and
transmitting the sunlight which passes through the hollow interior space of the hollow tube through a second sunlight-transparent end cap on a second end of the hollow tube.

35. The method of claim 34 wherein the step of guiding the sunlight through the hollow tube includes transmitting the sunlight through a sunlight-transmitting fluid contained within said tube.

36. The method of claim 35 wherein the step of guiding the sunlight through the hollow tube includes guiding the sunlight through the sunlight-transmitting fluid, which has an index of refraction greater than that of the hollow tube, to guide at least a portion of said sunlight by internal reflection from the first end of the tube to the second end of the tube.

37. The method of claim 34 including the step of positioning two or more hollow tubes, each having respective first and second end caps, to provide an extended sunlight guide.

38. A system for selectively concentrating solar energy through an opening in a structure, comprising:
a Fresnel lens oriented in a predetermined position to concentrate direct solar energy;
a first reflecting surface for receiving direct summer sunlight from the Fresnel lens and for reflecting said sunlight out of said system;
a second reflecting surface for receiving direct winter sunlight from the Fresnel lens and for reflecting said sunlight through the opening in the structure.

39. The system of claim 38 including a movable reflective shutter for covering the opening in the structure and reflecting sunlight out of the system.

40. The system of claim 38 including a motor and a motor control unit for moving the movable shutter.

41. The system of claim 40 including temperature sensitive means for controlling said motor control unit.

42. The system of claim 39 including direct mechanical actuator means for moving the shutter.

43. The system of claim 38 including means for automatically orienting the Fresnel lens to a predetermined orientation with respect to the sun.

44. The system of claim 38 wherein the Fresnel lens concentrates solar energy in a line.

45. A system for guiding sunlight from a skylight assembly, comprising:
a hollow tube having a hollow interior and having a first end for receiving sunlight from said skylight assembly and a second end for transmitting sunlight, said tube having internal walls for reflecting light from said first end to said second end;
sunlight-transmitting fluid contained in the hollow interior of said hollow tube, said fluid permitting light to be transmitted therethrough from said first end to said second end;
first sunlight-transparent means for capping the first end of said tube; and
second sunlight-transparent means for capping the second end of said tube.

46. The system of claim 45 wherein the index of refraction of the tube is less than the index of refraction of the fluid contained in the tube such that internal reflection occurs to guide light from the one end of the tube to the second end of the tube.

47. The system of claim 45 including two or more hollow tubes positioned respectively end-to-end to provide and extended system for transmitting sunlight.

48. The system of claim 45 wherein the first and the second sunlight-transparent means are, respectively, a first end plate and a second end plate of sunlight-transparent material fixed to the respective ends of a hollow tube.

49. The system of claim 45 wherein the hollow tube has a straight internal wall for guiding sunlight passing through the hollow tube in a substantially straight path.

50. The system of claim 45 wherein the hollow tube has a curved internal wall for guiding sunlight passing through the hollow tube in a curved path.

51. A method of guiding sunlight from a skylight assembly to one or more locations, comprising the steps of:
   transmitting sunlight from the skylight assembly through a first sunlight-transparent end cap on a first end of a hollow tube;
   guiding the sunlight transmitted through the first sunlight-transparent end cap into the hollow interior space of the hollow tube having an internal wall which reflects sunlight;
   transmitting the sunlight which passes through the first sunlight-transparent end cap and through the hollow interior space of the hollow tube; and
   transmitting the sunlight which passes through the hollow interior space of the hollow tube through a second sunlight-transparent end cap on a second end of the hollow tube.

52. The method of claim 51 wherein the step of guiding the sunlight through the hollow tube includes transmitting the sunlight through a sunlight-transmitting fluid contained within said tube.

53. The method of claim 52 wherein the step of guiding the sunlight through the hollow tube includes guiding the sunlight through the sunlight-transmitting fluid, which has an index of refraction greater than that of the hollow tube, to guide at least a portion of said sunlight by internal reflection from the first end of the tube to the second end of the tube.

54. The method of claim 51 including the step of positioning two or more hollow tubes, each having respective first and second end caps, to provide an extended sunlight guide.

55. The method of claim 51 wherein the step of transmitting the sunlight through the hollow tube includes transmitting the sunlight through a hollow tube having a straight interior wall.

56. The method of claim 51 wherein the step of transmitting the sunlight through the hollow tube includes transmitting the sunlight through a hollow tube having a curved interior wall to guide the sunlight along a curved path.

* * * * *

UNITED STATES PATENT AND TRADEMARK OFFICE
CERTIFICATE OF CORRECTION

PATENT NO. : 5,204,777

DATED : April 20, 1993

INVENTOR(S) : Donald B. Curchod

It is certified that error appears in the above-indentified patent and that said Letters Patent is hereby corrected as shown below:

On the title page, under item [19] and item [75], change "Curshod" to --Curchod--.

Signed and Sealed this

Eighth Day of March, 1994

*Attest:*

BRUCE LEHMAN

*Attesting Officer*     *Commissioner of Patents and Trademarks*